United States Patent
Cherian (10) Patent No.: US 7,596,226 B2
(45) Date of Patent: Sep. 29, 2009

(54) MOBILE TERMINAL, METHOD AND COMPUTER PROGRAM PRODUCT FOR STORING AND RETRIEVING NETWORK PARAMETERS

(75) Inventor: George Cherian, San Diego, CA (US)

(73) Assignee: Nokia Corporation, Espoo (FI)

( * ) Notice: Subject to any disclaimer, the term of this patent is extended or adjusted under 35 U.S.C. 154(b) by 596 days.

(21) Appl. No.: 10/894,275

(22) Filed: Jul. 19, 2004

(65) Prior Publication Data

US 2006/0014526 A1    Jan. 19, 2006

(51) Int. Cl.
*H04L 9/00*    (2006.01)
(52) U.S. Cl. ...................................... 380/277
(58) Field of Classification Search ................ 380/277; 455/418
See application file for complete search history.

(56) References Cited

U.S. PATENT DOCUMENTS

| | | | | |
|---|---|---|---|---|
| 5,978,686 A * | 11/1999 | Aoshima | ..................... | 455/525 |
| 6,857,072 B1 * | 2/2005 | Schuster et al. | ............. | 713/160 |
| 2002/0197979 A1 * | 12/2002 | Vanderveen | ................ | 455/410 |
| 2003/0134622 A1 * | 7/2003 | Hsu et al. | ................... | 455/414 |
| 2004/0073672 A1 * | 4/2004 | Fascenda | ..................... | 709/225 |
| 2004/0203684 A1 * | 10/2004 | Jokinen et al. | .............. | 455/418 |
| 2004/0235475 A1 * | 11/2004 | Ishii | ......................... | 455/435.3 |
| 2005/0122965 A1 * | 6/2005 | Heinla et al. | ................. | 370/357 |

FOREIGN PATENT DOCUMENTS

| | | | | |
|---|---|---|---|---|
| EP | 0786915 A2 * | 7/1997 | ................. | 455/403 |
| EP | 0786915 A2 | 7/1997 | | |
| WO | WO00/38440 | * 6/2000 | ................. | 455/403 |
| WO | WO 0038440 A1 | 6/2000 | | |
| WO | WO03/055237 A2 * | 7/2003 | ................. | 455/403 |
| WO | WO 03055237 A2 | 7/2003 | | |

OTHER PUBLICATIONS

3rd Generation Partnership Project 2 "3GPP2" specification, 3GPP2 C.S0005-C, Version 1.0, entitled *Upper Layer (Layer 3) Signaling Standard for cdma2000 Spread Spectrum Systems, Release C* (May 28, 2002).

* cited by examiner

*Primary Examiner*—Nasser G Moazzami
*Assistant Examiner*—Michael S McNally
(74) *Attorney, Agent, or Firm*—Alston & Bird LLP (57) ABSTRACT

A mobile terminal, method and computer program product are provided for storing sets of parameters, including the encryption keys, utilized during prior communication sessions with various networks such that those sets of parameters may be retrieved and reused during subsequent communication sessions with the same networks.

29 Claims, 3 Drawing Sheets

though the mobile terminal may have recently been within that same area and communicated in an encrypted manner with the base stations within that area in accordance with the same encryption key, thereby disadvantageously consuming system resources to reestablish the encryption key

MOBILE TERMINAL, METHOD AND COMPUTER PROGRAM PRODUCT FOR STORING AND RETRIEVING NETWORK PARAMETERS

FIELD OF THE INVENTION

The present invention relates generally to mobile terminals, methods and computer program products for facilitating communications with various networks and, more particularly, to mobile terminals, methods and computer program products for storing and retrieving sets of parameters including, for example, encryption keys, defined during prior communication sessions with respective networks so as to improve the efficiency of communications as a mobile terminal returns to and recommences communication with a network with which the mobile terminal previously communicated.

BACKGROUND OF THE INVENTION

One of the significant advantageous of a mobile terminal, such as a mobile telephone, a portable digital system (PDA), a pager, a laptop computer or other portable electronic device, is the mobility afforded the user. In this regard, a mobile terminal is able to move freely throughout a network and between networks while continuing to communicate via the network(s). Typically, a mobile terminal is capable of transmitting signals to and for receiving signals from base stations. A base station is, in turn, a part of one or more cellular or mobile networks that each include additional elements required to operate a network, such as a mobile switching center. In operation, the mobile switching center is capable of routing calls to and from the terminal via one or more base stations when the terminal is making and receiving calls. The mobile switching center can also provide a connection to landline trunks when the mobile terminal is involved in a call.

The signals transmitted between the base station and a mobile terminal may be encrypted. In a Code Division Multiple Access (CDMA) system, for example, the messages that are transmitted via the air interface, such as between a base station and a mobile terminal, are encrypted by means of an encryption key. As described by the $3^{rd}$ Generation Partnership Project 2 "3GPP2" specification 3GPP2 C.S0005-C, Version 1.0, entitled *Upper Layer (Layer 3) Signaling Standard for cdma2000 Spread Spectrum Systems*, Release C (May 28, 2002), the encryption key may be a Cellular Message Encryption Algorithm (CMEA) key generated using the cellular authentication and voice encryption (CAVE) algorithm in networks supporting 2G wireless communications protocols or an (IK, CK) key pair as a result of Authorization and Key Agreement (AKA) in networks supporting 3G wireless communications protocols.

A network is generally divided into a plurality of areas that are individually identified by means of a system identification number (SID) and a network identification number (NID). In this context, a system is a wireless communication service that covers a geographic area such as a city, metropolitan region, county, group of counties or the like and is uniquely identified by a SID, while a network is a subset of a system that may be as large or small as desired so long as the network is contained in one system and is uniquely identified within a system by a NID. For example, a network may be all base stations controlled by a respective base station controller.

For those base stations within a particular area identified by a respective SID/NID, the signals transmitted between the base stations and a mobile terminal are encrypted with a respective encryption key. The encryption key is only utilized within the particular area, however, such that movement of the mobile terminal to another area identified by another SID/NID will require signals transmitted between the mobile terminal and the base stations of the other area to be encrypted by means of another encryption key. Thus, the communications between a mobile terminal and the base stations within each area are encrypted by means of unique encryption key.

Upon initiation of communication between a base station and a mobile terminal within a respective area, the base station and the mobile terminal perform a registration and/or authentication process which, among other functions, establishes an encryption key to be utilized for subsequent signals transmitted between the base stations and the mobile terminal within the respective area. In the registration and/or authentication process, the mobile terminal generates an encryption key, while the base station generally obtains a corresponding encryption key from a respective visitor location register (VLR) or authorization center within the system. In a CDMA system, for example, the mobile terminal and the base station establish appropriate encryption keys by means of either an SSD update procedure or an authentication key agreement procedure. The mobile terminal and the base stations in the network identified by the respective SID/NID thereafter exchange signals encrypted with the encryption keys. As the mobile terminal moves from one area to another area as identified by a change in the SID/NID, the mobile terminal must repeatedly engage in the registration and/or authentication process with the base stations within each different area so as to establish the encryption keys to be utilized for subsequent communications within that area.

As will be recognized, the registration and/or authentication process by which encryption keys are established for subsequent communication within a respective area require significant network resources and slow the onset of actual communication with the mobile terminal pending establishment of the encryption keys. These disadvantages are multiplied in instances in which the mobile terminal crosses back and forth over the boundary between adjoining areas. In this situation, the entire registration process generally need not be repeated, but a resynchronization registration process or other type of authentication process must be repeatedly performed to establish the encryption keys. In particular, the mobile terminal may maintain a list of areas by SID/NID within which the mobile terminal has recently conducted communications. As such, upon the return to an area within which the mobile terminal had previous communication, the mobile terminal will recognize that the mobile terminal was recently registered with the base stations in the area and therefore need not repeat the entire registration process. However, the mobile terminal will conduct a resynchronization registration process or other type of authentication process with the base stations in the area, typically in response to receipt by the base station(s) of a signal from the mobile terminal that cannot be decrypted. Among other things, this resynchronization registration process establishes the encryption keys utilized during a subsequent communication session within the area. As noted above, this resynchronization registration or other type of authentication process must be repeatedly conducted upon entry of the mobile terminal into a different area to obtain the encryption key utilized for communications within that area even though the mobile terminal may have recently been within that same area and communicated in an encrypted manner with the base stations within that area in accordance with the same encryption key, thereby disadvantageously consuming system resources to reestablish the encryption key and delaying the onset of communications pending reestablishment of the encryption key.

BRIEF SUMMARY OF THE INVENTION

In light of the foregoing background, embodiments of the present invention provide an improved mobile terminal, method and computer program product for storing sets of parameters, including the encryption keys, utilized during prior communication sessions with various networks such that those sets of parameters may be reused during subsequent communication sessions with the same networks. By retaining and reusing the sets of parameters including the encryption keys, the parameters need not be reestablished, such as through a registration and/or authentication process, upon returning to a network with which a mobile terminal previously communicated. Thus, embodiments of the present invention provide for more efficient establishment of the parameters, including the encryption keys, to be utilized for subsequent communications with the same network with which a mobile terminal previously communicated. In this regard, the demand for system resources may be reduced and the speed with which communications are initiated with the network with which a mobile terminal previously communicated may be increased by retrieving the set of parameters, including the encryption key, that was previously utilized during prior communications with the same network without having to repeat the registration and/or authentication process.

According to one aspect of the present invention, a mobile terminal is provided that includes a processor capable of conducting communications with first and second networks in accordance with first and second sets of parameters, respectively. One of these parameters is generally an encryption key for facilitating encrypted communications between the mobile terminal and a respective network. As such, the processor is generally capable of encrypting signals transmitted to a network with a respective encryption key and/or decrypting signals received from the network with the respective encryption key. According to the present invention, the processor that has been conducting communications with a first network in accordance with a first set of parameters, such as a first encryption key, is capable of storing the first set of parameters in association with the first network such that the first set of parameters is retained even as the processor subsequently conducts communications with a second network in accordance with a second set of parameters such as a second encryption key.

In one embodiment, the processor is also capable of recognizing the transition from the first network to the second network and thereafter determining if the second set of parameters, such as the second encryption key, has been previously stored in association with the second network. If the processor determines that the second set of parameters has been previously stored, the processor be retrieve the second set of parameters including, for example, the second encryption key, for use during subsequent communications with the second network. Otherwise, the processor is capable of determining the second set of parameters, such as the second encryption key, such as by means of a registration and/or authentication process, if the second set of parameters has not been previously stored. By storing sets of parameters, including the encryption keys, associated with respective networks with which the mobile terminal has previously communicated, the mobile terminal of this aspect of the present invention can retrieve and reuse those parameters during subsequent communications with the same network, thereby permitting communications to be initiated in a more rapid manner while placing less demand on system resources by avoiding a repeat of the registration and/or authentication process as otherwise conducted to initially obtain the parameters, including the respective encryption key.

In one embodiment, each network is identified by a respective section identification number (SID)/network identification number (NID). In this embodiment, the processor of the mobile terminal can recognize the transition from the first network to the second network by a change in the SID/NID of the network with which the mobile terminal is to communicate. As such, the processor of this embodiment may store the first set of parameters, such as the first encryption key, in association with a SID/NID of the first network, thereby facilitating retrieval of the first set of parameters if the processor subsequently identifies a return to the first network. The processor of the mobile terminal may also be capable of determining if a set of parameters, such as an encryption key, that has been stored in association with a respective network remains valid prior to conducting communications in accordance therewith. For example, the processor of one embodiment is capable of storing a plurality of sets of parameters, such as a plurality of encryption keys, in association with different respective networks with which the processor has previously conducted communications. In this embodiment, the processor is further capable of determining if the plurality of sets of parameters remain valid and thereafter clearing any set of parameters that has become invalid. While various measures of validity can be employed, the processor of one embodiment determines if any of the plurality of sets of parameters were stored more than a predetermined time ago and, if so, clears those sets of parameters. Thus, the processor of this embodiment effectively times out the sets of parameters that have been stored so as to avoid reusing an outdated set of parameters.

According to other aspects of the present invention, a method and a computer program product are provided for facilitating communications of a mobile terminal with respective networks by storing sets of parameters, such as encryption keys, utilized during prior communications with various networks such that those sets of parameters can again be utilized during subsequent communications with the same networks. Embodiments of the present invention thereby provide an improved mobile terminal, method and computer program product by more efficiently establishing the parameters, such as the encryption key, that govern communications with the network in instances in which a mobile terminal has previously communicated with the same network. In this regard, the mobile terminal, method and computer program product of the present invention reduce the demand for system resources by avoid the repeated registration and/or authentication processes that otherwise would be employed. By reestablishing the set of parameters, including the encryption key, without a registration and/or authentication process, communications with the respective network may also be established in a more rapid manner in accordance with embodiments of the present invention.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
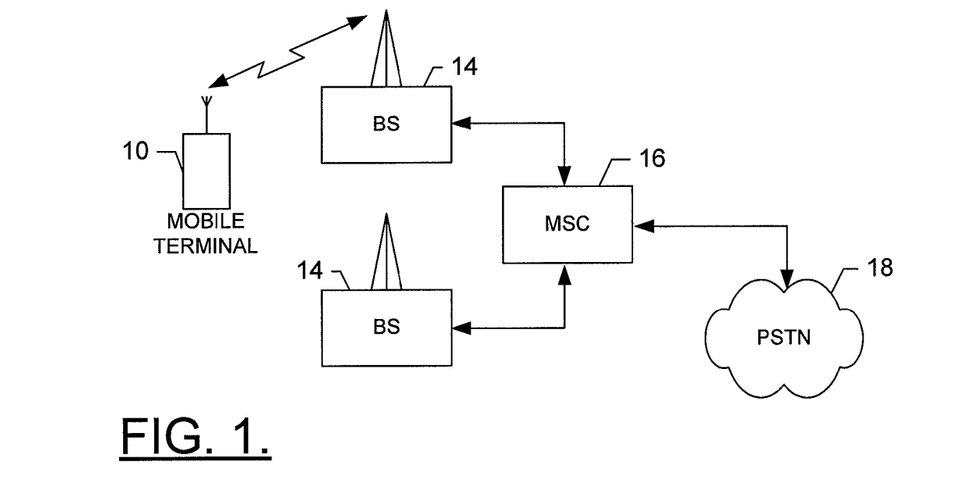
FIG. 1 is a block diagram of one type of a system that would benefit from embodiments of the present invention.

Referring to FIG. 1, an illustration of one type of system that would benefit from the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the system, method and computer program product of embodiments of the present invention can be utilized in conjunction with wireline and/or other wireless network (e.g., Internet) applications.

As shown, the system can include a mobile terminal 10 capable of transmitting signals to and for receiving signals from base sites or base stations (BS) 14, two of which are shown in FIG. 1. The base station is a part of one or more cellular or mobile networks that each includes elements required to operate the network, such as a mobile switching center (MSC) 16. As well known to those skilled in the art, the mobile network may also be referred to as a Base Station/MSC/Interworking function (BMI). In operation, the MSC is capable of routing calls to and from the terminal when the terminal is making and receiving calls. The MSC can also provide a connection to landline trunks 18 when the terminal is involved in a call. In addition, the MSC can be capable of controlling the forwarding of messages to and from the terminal, and can also control the forwarding of messages for the terminal to and from a messaging center.

Although not every element of every possible network is shown and described herein, it should be appreciated that the mobile terminal 10 can be coupled to one or more of any of a number of different networks. In this regard, mobile network(s) can be capable of supporting communication in accordance with any one or more of a number of first-generation (1G), second-generation (2G), 2.5G and/or third-generation (3G) mobile communication protocols or the like. In one embodiment, for example, the mobile terminal can be coupled to one or more networks capable of supporting communication in accordance with 2G wireless communication protocols such as CDMA and, more particularly, IS-95 (CDMA). In addition, for example, one or more of the network(s) can be capable of supporting communication in accordance with 3G wireless communication protocols such as CDMA including a Universal Mobile Telephone System (UMTS) network employing Wideband Code Division Multiple Access (WCDMA) radio access technology.

Figure 2:
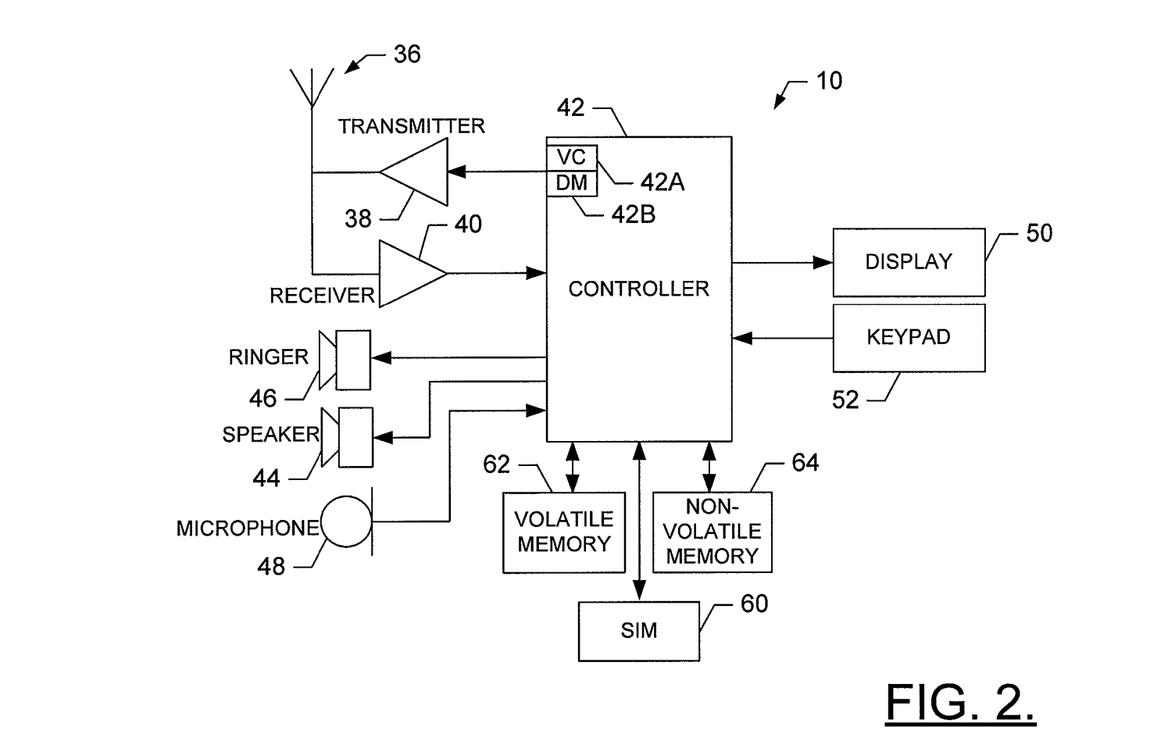
FIG. 2 is a schematic block diagram of a mobile terminal in accordance to one embodiment of the present invention.

Reference is now made to FIG. 2, which illustrates one type of mobile terminal 10 that would benefit from embodiments of the present invention. It should be understood, however, that the mobile terminal illustrated and hereinafter described is merely illustrative of one type of mobile terminal that would benefit from the present invention and, therefore, should not be taken to limit the scope of the present invention. While an embodiment in which the mobile terminal is a mobile telephone is illustrated and will be hereinafter described for purposes of example, other types of mobile terminals, such as portable digital assistants (PDAs), pagers, laptop computers and other types of mobile electronic systems, can readily employ the present invention.

As shown, in addition to an antenna 36, the mobile terminal 10 can include an interface, including a transmitter 38 and a receiver 40, and a processor, such as a controller 42 or the like, that provides signals to and receives signals from the transmitter and receiver, respectively. These signals include signaling information in accordance with the air interface standard of the applicable cellular system, and also user speech and/or user generated data. In this regard, the mobile terminal can be capable of operating with one or more air interface standards, communication protocols, modulation types, and access types. More particularly, the mobile terminal can be capable of operating in accordance with any of a number of first generation (1G), second generation (2G), 2.5G and/or third-generation (3G) communication protocols or the like. For example, the mobile terminal may be capable of operating in accordance with 2G wireless communication protocols such as CDMA and, more particularly, IS-95 (CDMA). Also, for example, the mobile terminal may be capable of operating in accordance with 3G wireless communication protocols such as CDMA including a Universal Mobile Telephone System (UMTS) network employing Wideband Code Division Multiple Access (WCDMA) radio access technology.

It is understood that the controller 42 includes the circuitry required for implementing the audio and logic functions of the mobile terminal 10. For example, the controller may be comprised of a digital signal processor device, a microprocessor device, and various analog-to-digital converters, digital-to-analog converters, and other support circuits. The control and signal processing functions of the mobile terminal are allocated between these devices according to their respective capabilities. The controller can additionally include an internal voice coder (VC) 42a, and may include an internal data modem (DM) 42b. Further, the controller may include the functionally to operate one or more software programs, which may be stored in memory (described below). For example, the controller may be capable of operating a connectivity program, such as a conventional Web browser. The connectivity program may then allow the mobile terminal to transmit and receive Web content, such as according to HTTP and/or the Wireless Application Protocol (WAP), for example.

The mobile terminal 10 also comprises a user interface including a conventional earphone or speaker 44, a ringer 46, a microphone 48, a display 50, and a user input interface, all of which are coupled to the controller 42. The user input interface, which allows the mobile terminal to receive data, can comprise any of a number of devices, such as a keypad 52, a touch display (not shown) or other input device. In embodiments including a keypad, the keypad includes the conventional numeric (0-9) and related keys (#, *), and other keys used for operating the mobile terminal. Although not shown, the mobile terminal can include a battery for powering the various circuits that are required to operate the mobile terminal.

The mobile terminal 10 can further include memory, such as a subscriber identity module (SIM) 60, a removable user identity module (R-UIM) or the like, which typically stores information elements related to a mobile subscriber. In addition to the SIM, the mobile terminal can include other removable and/or fixed memory. In this regard, the mobile terminal can include volatile memory 62, such as volatile Random Access Memory (RAM) including a cache area for the temporary storage of data. The mobile terminal can also include other non-volatile memory 64, which can be embedded and/or may be removable. The non-volatile memory can additionally or alternatively comprise an EEPROM, flash memory or the like. The memories can store any of a number of software applications, instructions, pieces of information, and data, used by the mobile terminal to implement the functions of the mobile terminal. For example, the memories can store the computer instructions necessary to implement the present invention, as described below. The memories can also store an identifier, such as an international mobile equipment identification (IMEI) code, international mobile subscriber identification (IMSI) code, mobile station integrated services digital network (MSISDN) code (mobile telephone number), Internet Protocol (IP) address, Session Initiation Protocol (SIP) address or the like, capable of uniquely identifying the mobile terminal.

Figure 3:
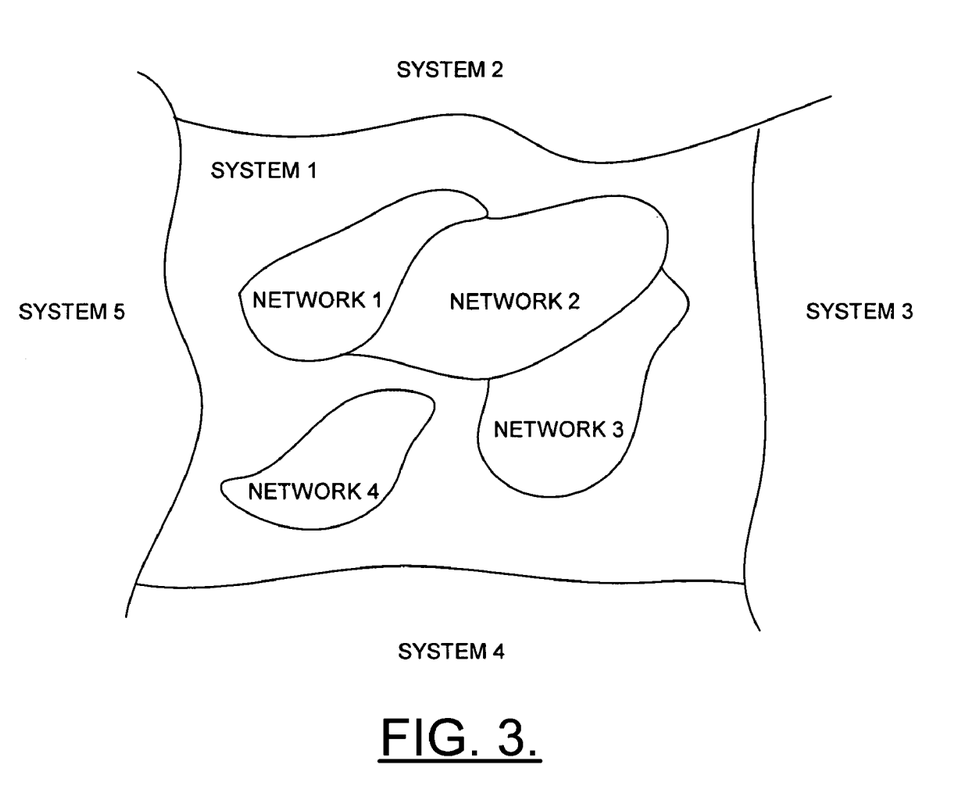
FIG. 3 is a schematic representation of multiple systems with at least one of which having multiple networks that are each identified by a respective session identification number (SID)/network identification number (NID) that would benefit from embodiments of the present invention.

As described above and as schematically illustrated in FIG. 3, the communications network is generally divided into a plurality of areas that are individually identified by means of a session identification number (SID)/network identification number (NID). As shown in FIG. 3, a communications network may be divided in this context into one or more systems that cover a geographic area such as a city, metropolitan region, county, group of counties or the like. Each of these systems include one or more networks. For example, each network in this context may include all base stations controlled by a respective base station controller. In the exemplary embodiment of FIG. 3, system 1 includes network 1, network 2, network 3 and network 4 identified by SID/NID's of 1/1, 1/2, 1/3 and 1/4, respectively. As also shown by FIG. 3, the overall communications network may also include second, third, fourth and fifth systems, any one or all of which may also include multiple networks (not shown).

In order to appraise the mobile terminals 10 of the particular network in which the mobile terminals are currently located, the network generally broadcasts the SID/NID of the respective network, such as by means of the paging channel transmitted by the base station 14 within the respective network. As described above, a set of parameters is generally defined as an initial manner in advance prior to the establishment of actual communications between the mobile terminal and the base stations within a respective network. These parameters assist in and at least partially define the manner in which the subsequent communications are conducted. These parameters generally include an encryption key such that signals transmitted between the mobile terminal and the base station of the respective network can be encrypted in accordance with the encryption key.

Various types and levels of encryption may be employed with two examples provided by the 3GPP2 specification in the context of a CDMA system being a CMEA key generated using CAVE in a network supporting 2G wireless communications protocols and an (IK, CK) key pair as a result of AKA in networks supporting 3G wireless communications protocols. See, for example, the 3rd Generation Partnership Project 2 "3GPP2" specification, 3GPP2 C.S0005-C, Version 1.0, entitled *Upper Layer (Layer 3) Signaling Standard for cdma2000 Spread Spectrum Systems*, Release C (May 28, 2002), the contents of which are incorporated herein by reference in their entirety.

Other parameters may also be established prior to communications between a mobile terminal 10 and the base station 14 of a respective network, such as a temporary mobile station identifier (TMSI) and a retry timer, for example.

The mobile terminal 10 and more particularly, the processor of the mobile terminal, generally maintain a list (a SID/NID list) 70 of networks, typically defined by SID/NID of each network, with which the mobile terminal has had communications. See, for example, FIG. 4. This list is generally stored in memory, such as either the internal memory within the processor or volatile memory 62. Although not necessary for the practice of the present invention, the SID/NID list may be defined so as to have a maximum size, such as 10. As such, the processor will retain the SID/NID of the predetermined number of networks with which the mobile terminal has most recently had communications. Once the SID/NID list has been fully populated by including the maximum number of SID/NIDs, the establishment of communications with a different network will cause the processor to store the SID/NID of the new network in the list while deleting or overwriting the oldest SID/NID previously in the list, that is, with the SID/NID associated with the network (from among those on the SID/NID list) with which the mobile terminal has gone the longest period of time without communicating. In addition to being limited to a predetermined number, the SID/NID list may be defined to only include those SID/NIDs of networks with which the mobile terminal is communicated within a predetermined period of time. Thus, even if the SID/NID list has not reached its maximum size, the processor could evaluate the list and delete the SID/NIDs that identify any networks with which the mobile terminal has not communicated within the predetermined period of time. As such, the processor in this embodiment not only limits the size of the SID/NID list, but also ensures that the SID/NID list is relatively current.

Figure 4:
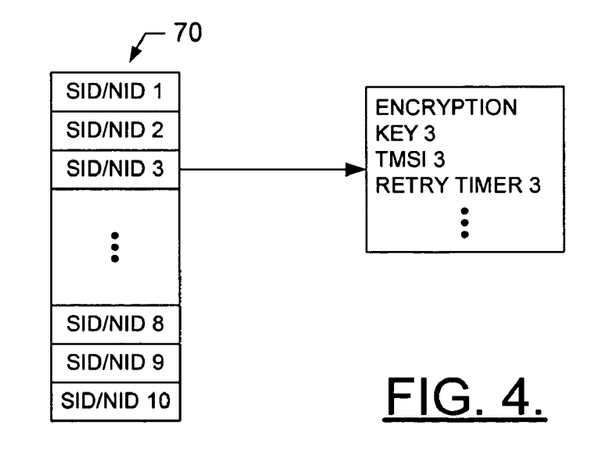
FIG. 4 is a representation of a SID/NID list that points to corresponding sets of parameters including corresponding encryption keys in accordance with one embodiment of the present invention.

According to the present invention, the mobile terminal 10 and, in particular, the processor of the mobile terminal stores additional information along with the SID/NIDs that identify the networks with which the mobile terminal most recently communicated. In this regard, the processor stores the sets of parameters that were defined and utilized during the prior communications conducted between the mobile terminal and the respective networks as identified in the SID/NID list 70 by their respective SID/NIDs. As shown in FIG. 4, each entry in the SID/NID list includes or is linked to an associated set of parameters that were defined and utilized during the prior communication session between the mobile terminal and the respective network as defined by the SID/NID. The set of parameters may include various parameters including the encryption key utilized during the prior communication session. While the set of parameters may include only the encryption key, the set of parameters generally also includes other parameters such as the TMSI, the retry timer and the like that were established during the prior communication session with the respective network. The set of parameters associated with each SID/NID may include the same parameters or the parameters may vary from one network to another. In any event, the processor generally stores the sets of parameters associated with the networks with which the mobile terminal has most recently communicated in memory such as the internal memory of the processor or volatile memory 62. As shown in FIG. 4, the processor may establish a SID/NID list with each entry in the SID/NID effectively linking to a set of parameters including the encryption key that is associated with the network identified by the respective SID/NID. Alternatively, the SID/NID list itself may include these sets of parameters.

In operation, a mobile terminal 10 will be appraised of the network that would currently service the mobile terminal by means of a broadcast of the SID/NID identifying the network, such as by means of the paging channel transmitted by the base stations 14 of the respective network. The mobile terminal receives the SID/NID of the respective network as shown in step 72 of FIG. 5 and, in instances in which the mobile terminal desires to establish communications with the network, determines if the network is one with which the mobile terminal has recently communicated. In this regard, the mobile terminal and, in particular, the processor reviews the SID/NID list 70 to determine if the SID/NID of the respective network is included in the list. See step 74. If not, the mobile terminal and the base station of the network engage in an authentication process followed by a registration process as known to those skilled in the art. Various types of authentication processes may be employed, including, for example, an SSD update procedure or an authentication key agreement procedure. The authentication and registration processes define the set of parameters that govern the subsequent communications between the mobile terminal and the respective network. See step 76. As noted above, the set of parameters generally includes an encryption key along with other parameters, such as the TMSI, the retry timer and the like. Although an authentication process is mentioned above to precede the registration process, the authentication process may be incorporated with the registration process if so desired.

Once the parameters have been defined, the mobile terminal 10, and, in particular, the processor of the mobile terminal, conducts communications with the network in accordance with those parameters. See step 80 of FIG. 5. For example, the mobile terminal transmits signals encrypted in accordance with the respective encryption key and decrypts signals received in an encrypted manner from the base stations 14 of the respective network with the encryption key. The processor also stores the set of parameters in association with the respective network as noted in step 78 of FIG. 5. In this regard, the processor generally stores the set of parameters including the encryption key in association with the SID/NID that identifies the respective network. As described above, the set of parameters may be stored in the SID/NID list 70 maintained by the processor or the set of parameters may be stored in such a manner as to be linked or pointed to by the corresponding entry in the SID/NID list.

During and following the communications session, the mobile terminal 10 continues to monitor the paging channel or other transmissions that identify the SID/NID of the network that is currently adapted to service the mobile terminal. In instances in which the mobile terminal is moved from one network to another, the mobile terminal and, in particular, the processor will denote the transition from one network to another by determining that the SID/NID identifying the respective network is now different. See step 82 of FIG. 5. Since the mobile terminal has moved into the service area of another network, the mobile terminal must establish a different set of parameters, including a different encryption key for subsequent communications with this other network.

As such, the mobile terminal 10 initially reviews the SID/NID list 70 to determine if the SID/NID that identified this other network is included in the list such that the mobile terminal would have previously communicated with this same network in the relatively recent past. If the SID/NID of this other network is not included in the SID/NID list, the mobile terminal and, in particular, the processor proceeds to establish the appropriate set of parameters and to store that set of parameters, including the encryption key in association with this other network, such as in association with the SID/NID of this other network in the same manner described above. If, however, the processor determines that the set of parameters necessary for establishing communications with this other network has previously been stored, the processor can obtain the parameters from memory and utilize the stored set of parameters, thereby avoiding at least portions of the registration and/or authentication processes. See step 84 of FIG. 5. By way of example, the processor may review the SID/NID list and identify the SID/NID of this other network. As such, the processor can obtain the set of parameters associated with the SID/NID of this other network including, for example, the encryption key and can thereafter establish communications with the other network in accordance with those parameters, such as by transmitting signals encrypted in accordance with the encryption key and decrypting signals received from the base stations of the network in accordance with the encryption key.

By retrieving the set of parameters including the encryption key that were utilized during a prior communication session with the same network, the mobile terminal 10 of the present invention need not conduct the registration and/or authentication process, or at least need not conduct as complete a registration or authentication process, upon the return of the mobile terminal to the network as would otherwise be required in order to initially establish the set of parameters. By eliminating at least a portion of the registration and/or authentication procedures, the mobile terminal of the present invention decreases its demand on system resources and initiates communications upon its return to the network in a more rapid fashion.

As will be apparent to those skilled in the art, this retrieval of prestored parameters is especially advantageous in instances in which a mobile terminal 10 transitions back and forth between two or more networks, such as in instances in which a mobile terminal is located at or near the boundary between two or more networks. As such, the mobile terminal need not repeatedly conduct a registration and/or authentication procedure or at least need not conduct the entire registration and/or authentication procedure that would otherwise be required and is able to obtain the necessary parameters, including the encryption key, from memory in a more expeditious manner.

According to one embodiment of the present invention, upon detecting a transition to a different network, the processor not only determines if the parameter associated with the new network has previously been stored, but also determines if those parameters that have been previously stored remain valid. While various measures of validity may be employed without departing from the spirit and scope of the present invention, the processor of one embodiment stores a time value along with each set of parameters. This time value is typically the time at which the parameters were initially defined such as a result of the initial registration and/or authentication process. However, the time value may, instead, be the time at which the parameters will become invalid and is therefore set at some time, such as predefined time, in the future following the original definition of the parameters. In this embodiment, after determining that the set of parameters associated with the new network had been previously stored, the processor may determine if the set of parameters were stored more than a predefined time ago, such as by reviewing the time value associated with the set of parameters. If the parameters were stored more than a predetermined time ago, the processor of this embodiment will consider the set of parameters invalid and will repeat the registration and/or authentication process in order to generate a new set of parameters, thereby avoiding any use of a set of parameters that may be considered outdated and ineffective. While the processor may consider the validity of the set of parameters in the response to having detected a transition to a new network, the processor may periodically review the various sets of parameters that are stored in memory and clear or delete any sets of parameters that are no longer valid, such as any sets of parameters that were stored more than a predetermined period of time ago. Embodiments of the present invention therefore take advantage of the efficiencies offered by reutilizing sets of parameters that were previously generated during a prior communication session with the same network without attempting to reutilize parameters that may be outdated or no longer effective.

According to one aspect of the present invention, all or a portion of the system and method of the present invention, such all or portions of the mobile terminal 10, generally operate under control of a computer program product. The computer program product for performing the methods of embodiments of the present invention includes a computer-readable storage medium, such as the non-volatile storage medium 64, and computer-readable program code portions, such as a series of computer instructions, embodied in the computer-readable storage medium.

Figure 5:
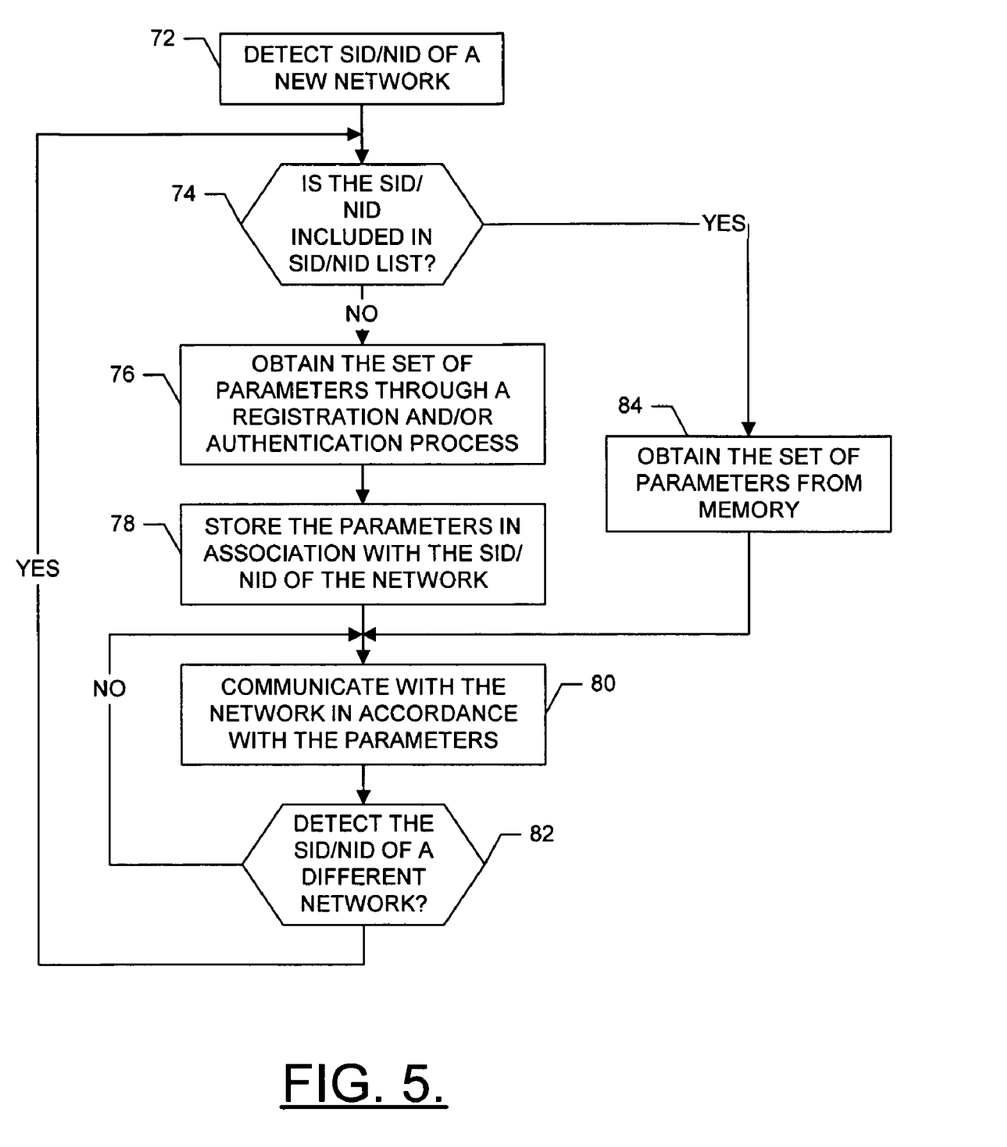
FIG. 5 is a flow chart illustrating operations performed in accordance with one embodiment of the present invention.

In this regard, FIG. 5 is a control flow diagram of a method, system and program product according to the invention. It will be understood that each block or step of the control flow diagram, and combinations of blocks in the control flow diagram, can be implemented by computer program instructions. These computer program instructions may be loaded onto a computer or other programmable apparatus, such as the controller 42, to produce a machine, such that the instructions which execute on the computer or other programmable apparatus create means for implementing the functions specified in the control flow diagram block(s) or step(s). As noted above, these computer program instructions may also be stored in a computer-readable memory, such as the non-volatile storage medium 64, that can direct a computer or other programmable apparatus, such as the controller, to function in a particular manner, such that the instructions stored in the computer-readable memory produce an article of manufacture including instruction means which implement the function specified in the control flow diagram block(s) or step(s). The computer program instructions may also be loaded onto a computer or other programmable apparatus, such as the controller, to cause a series of operational steps to be performed on the computer or other programmable apparatus to produce a computer implemented process such that the instructions which execute on the computer or other programmable apparatus provide steps for implementing the functions specified in the control flow diagram block(s) or step(s).

Accordingly, blocks or steps of the control flow diagram support combinations of means for performing the specified functions, combinations of steps for performing the specified functions and program instruction means for performing the specified functions. It will also be understood that each block or step of the control flow diagram, and combinations of blocks or steps in the control flow diagram, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising at least one processor and at least one memory including computer program code, the at least one memory and the computer program code configured to, with the at least one processor, cause the apparatus or an other apparatus to perform at least the following:

receiving a first network identifier from a first network;

comparing the first network identifier to the list of network identifiers to determine if a first set of parameters including a first encryption key had been previously stored in response to a previous communications session with the first network;

retrieving the first set of parameters including the first encryption key and provide for communication with the first network in accordance with the retrieved first encryption key when comparing the first network identifier to the list of network identifiers determines that the first network identifier is included in the list of network identifiers;

storing the first set of parameters including the first encryption key when comparing the first network identifier to the list of network identifiers determines that the first network identifier is not included in the list of network identifiers;

storing the first network identifier received from the first network in the list of network identifiers when comparing the first network identifier to the list of network identifiers determines that the first network identifier is not included in the list of network identifiers; and generating and storing a replacement set of parameters for the first set of parameters in response to:

detecting a communications transition from another network to the first network, and determining that the first set of parameters were stored more than a predetermined time ago.

2. An apparatus according to claim 1 wherein the apparatus or the other apparatus is further caused to perform determining if a second set of parameters that has been stored in association with a second network remains valid prior to providing for communications in accordance therewith.

3. An apparatus according to claim 1 wherein the apparatus or the other apparatus is further caused to perform storing a plurality of sets of parameters in association with different respective networks with which said processor has previously provided for communications.

4. An apparatus according to claim 3 wherein the apparatus or the other apparatus is further caused to perform determining if the plurality of sets of parameters remain valid and clearing any set of parameters that has become invalid.

5. An apparatus according to claim 4 wherein the apparatus or the other apparatus is further caused to perform determining if any of the plurality of sets of parameters were stored more than a predetermined time ago and clearing any set of parameters that was stored more than the predetermined time ago.

6. An apparatus comprising at least one processor and at least one memory including computer program code, the at least one memory and the computer program code configured to, with the at least one processor, cause the apparatus or an other apparatus to perform at least the following:
(i) encrypting signals transmitted to a first network with a first encryption key, or
(ii) decrypting signals received from the first network with the first encryption key;
the apparatus or the other being further caused to perform:
storing the first encryption key in association with the first network such that the first encryption key is retained,
receiving a second network identifier from the second network,
comparing the second network identifier to a list of network identifiers to determine if a second encryption key had been previously stored in association with the second network,
storing the second network identifier received from the second network when the second network identifier is not included in the list of network identifiers, and
retrieving the second encryption key when the second network identifier is included in the list of network identifiers;
the apparatus or the other apparatus being further caused to perform:
(i) encrypting signals transmitted to a second network with the second encryption key, or
(ii) decrypting signals received from the second network with the second encryption key; and
the apparatus or the other apparatus being further caused to perform generating and storing a replacement encryption key for the first encryption key in response to:
detecting a communications transition from another network to the first network, and
determining that the first encryption key was stored more than a predetermined time ago.

7. An apparatus according to claim 6 wherein each network is identified by a respective session identification number (SID)/network identification number (NID), and wherein the apparatus or the other apparatus is caused to perform recognizing a transition from the first network to the second network by a change in the SID/NID of the network.

8. An apparatus according to claim 7 wherein the apparatus or the other apparatus is further caused to perform storing the first encryption key in association with a SID/NID of the first network.

9. An apparatus according to claim 6 wherein the apparatus or the other apparatus is further caused to perform determining if the second encryption key that has been stored in association with the second network remains valid prior to providing for communications in accordance therewith.

10. An apparatus according to claim 6 wherein the apparatus or the other apparatus is further caused to perform storing a plurality of encryption keys in association with different respective networks with which said processor has previously provided for communications.

11. An apparatus according to claim 10 wherein the apparatus or the other apparatus is further caused to perform determining if the plurality of encryption keys remain valid and clearing any encryption key that has become invalid.

12. An apparatus according to claim 11 wherein the apparatus or the other apparatus is further caused to perform determining determine if any of the plurality of encryption keys were stored more than a predetermined time ago and clearing any encryption key that was stored more than a predetermined time ago.

13. A method comprising:
receiving the first network identifier from a first network;
comparing the first network identifier to the list of network identifiers to determine if the first set of parameters had been previously stored in association with the first network identifier;
retrieving the first set of parameters including the first encryption key and providing for communications with the first network in accordance with the retrieved first encryption key when comparing the first network identifier to the list of network identifiers determines that the first network identifier is included in the list of network identifiers;
storing the first set of parameters including the first encryption key when comparing the first network identifier to the list of network identifiers determines that the first network identifier is not included in the list of network identifiers;
storing the first network identifier received from the first network in the list of network identifiers when comparing the first network identifier to the list of network identifiers determines that the first network identifier is not included in the list of network identifiers; and
generating and storing, via a processor, a replacement set of parameters for the first set of parameters in response to:
detecting a communications transition from another network to the first network, and
determining that the first set of parameters were stored more than a predetermined time ago.

14. A method according to claim 13 wherein providing for communications with the first network comprises at least one of: (i) encrypting signals transmitted to the first network with the first encryption key or (ii) decrypting signals received from the first network with the first encryption key, and wherein storing the first set of parameters comprises storing the first encryption key in association with the first network.

15. A method according to claim 14 wherein the first network is identified by a respective session identification number (SID)/network identification number (NID), and wherein recognizing a transition from the first network to a second network comprises recognizing a change in a received SID/NID.

16. A method according to claim 15 wherein storing the first set of parameters including the first encryption key comprises storing the first encryption key in association with a SID/NID of the first network.

17. A method according to claim 13 further comprising determining if a second set of parameters that has been stored in association with a second network remains valid prior to providing for communications in accordance therewith.

18. A method according to claim 13 further comprising storing a plurality of sets of parameters in association with different respective networks with which communications has been previously provided for.

19. A method according to claim 18 further comprising:
determining if the plurality of sets of parameters remain valid; and
clearing any set of parameters that has become invalid.

20. A method according to claim 19 wherein determining validity comprises determining if any of the plurality of sets of parameters was stored more than a predetermined time ago, and wherein clearing any invalid set of parameters comprises clearing any set of parameters that was stored more than the predetermined time ago.

21. A computer program product comprising at least one computer-readable storage medium having computer-readable code portions stored therein, the computer-readable program code portions comprising:
   a first executable portion configured to receive the first network identifier from a first network;
   a second executable portion configured to compare the first network identifier to the list of network identifiers to determine if a first set of parameters including a first encryption key had been previously stored in association with the first network identifier;
   a third executable portion configured to retrieve the first set of parameters including a first encryption key and providing for communications with the first network in accordance with the retrieved first encryption key when comparing the first network identifier to the list of network identifiers determines that the first network identifier is included in the list of network identifiers;
   a fourth executable portion configured to store the first set of parameters including the first encryption key when comparing the first network identifier to the list of network identifiers determines that the first network identifier is not included in the list of network identifiers;
   a fifth executable portion configured to store the first network identifier received from the first network in the list of network identifiers when comparing the first network identifier to the list of network identifiers determines that the first network identifier is not included in the list of network identifiers; and
   a sixth executable portion configured to generate and store a replacement set of parameters for the first set of parameters in response to:
      detecting a communications transition from another network to the first network, and
      determining that the first set of parameters were stored more than a predetermined time ago.

22. A computer program product according to claim 21 wherein said third executable portion is further configured to: (i) encrypt signals transmitted to the first network with the first encryption key, or (ii) decrypt signals received from the first network with the first encryption key; wherein said fourth executable portion is further configured to store the first set of parameters including the first encryption key in association with the first network, and wherein the computer-readable code portions further include a sixth executable portion configured to provide for communications with a second network; and wherein the computer-readable program code portions further comprise an eighth executable portion configured to: (i) encrypting signals transmitted to the first network with the first encryption key, or (ii) decrypt signals received from the first network with the first encryption key.

23. A computer program product according to claim 22 wherein each network is identified by a respective session identification number (SID)/network identification number (NID), and wherein said first executable portion is further configured to recognize a change in a received SID/NID.

24. A computer program product according to claim 23 wherein said fourth executable portion is further configured to store the first encryption key in association with a SID/NID of the first network.

25. A computer program product according to claim 21 wherein said second executable portion is further configured to determine if the first set of parameters that has been stored in association with the first network remains valid prior to providing for communications in accordance therewith.

26. A computer program product according to claim 21 wherein said fourth executable portion is further configured to store a plurality of sets of parameters in association with different respective networks with which communications has been previously provided for.

27. A computer program product according to claim 26 further comprising:
   a seventh executable portion configured to determine if the plurality of sets of parameters remain valid; and
   an eighth executable portion configured to clear any set of parameters that has become invalid.

28. A computer program product according to claim 27 wherein said seventh executable portion is further configured to determine if any of the plurality of sets of parameters was stored more than a predetermined time ago, and wherein said eighth executable portion is further configured to clear any set of parameters that was stored more than the predetermined time ago.

29. An apparatus comprising at least one processor and at least one memory and the computer program code configured to, with the at least one processor, cause the apparatus or another apparatus to perform at least the following:
   receiving a network identifier from a network;
   comparing the network identifier to a list of network identifiers to determine if the network identifier and an associated encryption key had been previously stored;
   retrieving the associated encryption key and provide for communication with the network in accordance with the retrieved encryption key when the network identifier is found in the list of network identifiers;
   storing the associated encryption key when comparing the network identifier to the list of network identifiers determines that the network identifier is not included in the list of network identifiers;
   storing the network identifier received from the network in the list of network identifiers when comparing the first network identifier to the list of network identifiers determines that the network identifier is not included in the list of network identifiers; and
   generating and store a replacement encryption key in response to:
      detecting a communications transition from another network to the network, and
      determining that the associated encryption key was stored more than a predetermined time ago.

* * * * *

UNITED STATES PATENT AND TRADEMARK OFFICE
CERTIFICATE OF CORRECTION

PATENT NO. : 7,596,226 B2   Page 1 of 1
APPLICATION NO. : 10/894275
DATED : September 29, 2009
INVENTOR(S) : Cherian

It is certified that error appears in the above-identified patent and that said Letters Patent is hereby corrected as shown below:

Column 14,
Line 1, cancel "determine".

Column 15,
Line 52, "encrypting" should read --encrypt--.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,596,226 B2  Page 1 of 1
APPLICATION NO. : 10/894275
DATED : September 29, 2009
INVENTOR(S) : George Cherian It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 938 days.

Signed and Sealed this

Twenty-eighth Day of September, 2010

David J. Kappos
*Director of the United States Patent and Trademark Office*